United States Patent [19]

Kikuchi

[11] Patent Number: 5,117,955
[45] Date of Patent: Jun. 2, 1992

[54] TEMPERATURE-CONTROLLED FLUID FRICTION COUPLING

[75] Inventor: Yasuhei Kikuchi, Shizuoka, Japan

[73] Assignee: Usui Kokusai Sangyo Kaisha Ltd., Shizuoka, Japan

[21] Appl. No.: 738,547

[22] Filed: Jul. 31, 1991

[30] Foreign Application Priority Data

Jul. 31, 1990 [JP] Japan .................................. 2-201203

[51] Int. Cl.⁵ .............................................. F16D 35/02
[52] U.S. Cl. ................................. 192/58 B; 192/82 T; 123/41.12
[58] Field of Search ................. 192/58 B, 58 C, 82 T; 123/41.12

[56] References Cited

U.S. PATENT DOCUMENTS

| | | | |
|---|---|---|---|
| 3,019,875 | 2/1962 | Fowler | 192/58 C |
| 3,180,571 | 4/1965 | Caroli et al. | 192/58 C X |
| 3,194,372 | 7/1965 | Weir | 192/58 B |
| 3,323,623 | 6/1967 | Roper | 192/58 B |
| 3,739,891 | 6/1973 | LaFlame | 192/58 C |
| 4,282,960 | 8/1981 | Glasson et al. | 192/58 C |
| 4,662,495 | 5/1987 | Brunken | 192/58 B |
| 4,930,457 | 6/1990 | Tamai | 123/41.12 |

*Primary Examiner*—Richard Lorence
*Attorney, Agent, or Firm*—Wenderoth, Lind & Ponack

[57] ABSTRACT

A temperature-controlled fluid friction coupling for intermittently driving a cooling fan of an internal combustion engine. The coupling comprises a drive input shaft having a rotor thereon, a housing rotatably supported on the drive input shaft for supporting a cooling fan, a fixed partition for dividing an interior space of the housing into a torque transmitting chamber and a reservoir chamber, a movable partition for dividing the reservoir chamber into an active chamber and a vacant chamber, a flexible annular diaphragm disposed between the movable partition and the housing, and a temperature sensitive element disposed outside of the housing.

Surfaces of the rotor provide shearing surface gaps around the rotor. The temperature sensitive element moves the movable partition in axial directions depending upon a change of ambient temperature thereby changing the distance between the two partitions and controlling a fan revolution speed.

3 Claims, 2 Drawing Sheets

TEMPERATURE-CONTROLLED FLUID FRICTION COUPLING

BACKGROUND OF THE INVENTION

This invention relates to a temperature-controlled fluid friction coupling for intermittently driving a cooling fan of an internal combustion engine.

In a typical design of a temperature-controlled fluid friction coupling, such as U.S. Pat. No. 4,662,495—Brunken, a housing is rotatably supported on a drive input shaft adapted to connect with an internal combustion engine, and the interior space of the housing is divided into a reservoir chamber and a torque transmitting chamber by a partition. On the drive input shaft a rotor is fixed so as to form mutually opposite shearing surface gaps between the housing and the rotor. A cooling fan is attached to an outer surface of the housing which comprises a front cover and a rear body.

To the outer surface of the front cover, is mounted a temperature sensitive element made of a bimetal which curves in response to a change of ambient temperature. In the partition, a valve opening is provided and a valve lever for opening and closing the valve opening is mounted. The valve lever is initially stressed in the opening direction. Between the bimetal and the valve lever, is disposed an actuating pin which transmits a deformation of the bimetal to the valve lever.

As the bimetal is deformed by a change of the ambient temperature, the valve lever moves toward the same direction through the actuating pin, allowing the valve opening to open or close. Then, viscous fluid flows into or out of the shearing surface gaps to effect or break the torque transmitting performance.

The ambient temperature sensed by the bimetal is generally the temperature of air after having passed through a radiator. For example, at a low temperature below 60 degrees centigrade, the bimetal is kept in a relatively flat shape and the valve lever closes the valve opening. In this situation, viscous fluid is raked out by a dam from the torque transmitting chamber to the reservoir, whereby the fluid-friction coupling is kept in OFF condition.

Conversely, at a high temperature above 60 degrees centigrade, the bimetal curves toward the outer direction of the housing, permitting the free end of the valve lever to separate from a periphery of the valve opening. In this situation in turn, the viscous fluid flows from the reservoir to the torque transmitting chamber, whereby the fluid friction coupling is turned into ON condition.

During the OFF condition, the transmitting torque is relatively small and a fan rotation speed is relatively low. During the ON condition, the transmitting torque goes up and the fan rotation speed also goes up.

However, even in the OFF condition, the fan idling speed tends to rise to a relatively high level, for example 900 rpm in a winter morning. This is well known as "a creeping revolution" caused by a relatively small transmitting torque which is produced by a residual viscous fluid within the shearing surface gaps, as well as produced by a bearing friction between the housing and the drive input shaft.

Originally, the fluid friction coupling was provided for the purpose of lowering a fan idling revolution thereby to reduce a noise, fuel consumption, and an engine warming up time. However, the existing creeping revolution exhibits undesirable drawbacks against the original purposes.

SUMMARY OF THE INVENTION

It is an object of the present invention to provide a temperature-controlled fluid friction coupling which can lower the fan idling speed and reduce the fan idling noise during the OFF condition of the coupling.

Another object of the invention it to lessen the engine warming up time.

Still another object of the invention is to reduce fuel consumption, accompanied by a reduction of the fan idling speed.

According to the characteristics of the invention, an interior space of a housing is divided into a torque transmitting chamber and a reservoir chamber by a fixed partition. Further, the reservoir chamber is divided into an active chamber and a vacant chamber by a movable partition, which can translate along axial directions. A flexible diaphragm is disposed between the movable partition and the housing.

The fixed partition has a central opening and a peripheral slot for providing a viscous fluid communication between the torque transmitting chamber and the active chamber. Surfaces of a rotor carried on a drive input shaft provide shearing surface gaps around the rotor. A temperature sensitive element disposed outside of the housing moves the movable partition in axial directions depending upon a change of ambient temperature, thereby changing the axial distance between the movable partition and the fixed partition. This movement causes viscous fluid to flow into or out of the shearing surface gaps, thereby controlling the fan revolution speed.

When the movable partition is moved toward the fixed partition, the diaphragm pushes viscous fluid into the torque transmitting chamber through the central opening of the fixed partition. The viscous fluid flows into the shearing surface gaps around the rotor. Then, the coupling is turned into ON condition. An engine torque is transmitted from the rotor to the housing and finally to the cooling fan, whereby the fan begins rotation.

On the other hand, when the movable partition is moved away from the fixed partition, the diaphragm introduces viscous fluid from the shearing surface gaps through the peripheral slot of the fixed partition. Then, the coupling is turned into OFF condition, in which most of the viscous fluid is pushed against the periphery of the active chamber due to a centrifugal force.

According to a preferable embodiment of the invention, a dam is secured to a peripheral wall of the torque transmitting chamber such that its position corresponds to the peripheral slot of the fixed partition. Most of circumferentially flowing viscous fluid collide against the dam and are deflected toward the peripheral slot. Thus, during the OFF condition, there is little viscous fluid around the rotor. Most of transmitting torque is eliminated, and the fan idling speed is reduced to minimum.

Embodiments of the invention will now be described by way of example with reference to the drawings, in which like reference numerals refer to like elements in the several views.

DESCRIPTION OF THE PREFERRED EMBODIMENT

Figure 1:
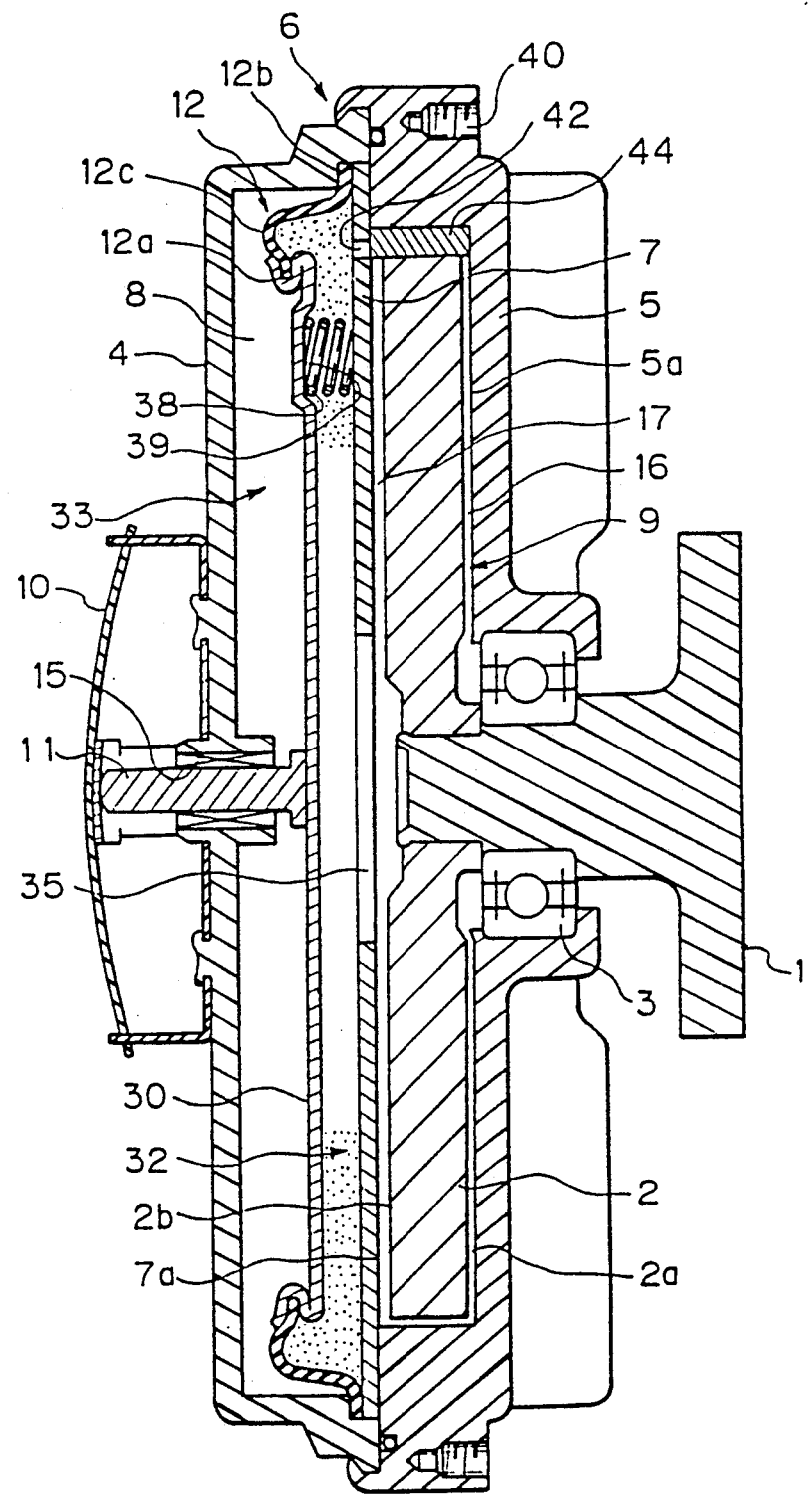
FIG. 1 is a vertical sectional view of a fluid friction coupling according to the invention, showing OFF condition of the coupling.

Referring to FIG. 1, there is shown a temperature-controlled fluid friction coupling according to the present invention. This coupling comprises a drive input shaft 1 having a rotor 2 thereon, a housing 6 for supporting a cooling fan, a fixed partition 7 for dividing the interior space of the housing 6 into a torque transmitting chamber 9 and a reservoir chamber 8, a movable partition 30 for dividing the reservoir chamber 8 into an active chamber 32 and a vacant chamber 33, a flexible annular diaphragm 12 disposed between the movable partition 30 and the housing 6, and a temperature sensitive element made of a bimetal 10 disposed outside of the housing 6.

The housing 6 having a cover 4 and a body 5 is rotatably supported on the drive input shaft 1 by means of a bearing 3. The fixed partition 7 has a central opening 35 and a peripheral slot 42 for providing a fluid communication between the torque transmitting chamber 9 and the active chamber 32. Adjacent the slot 42, a dam 44 is secured to the peripheral wall of the torque transmitting chamber 9.

An interior edge 12a of the diaphragm 12 is attached to the movable partition 30, and an outer periphery 12b of the diaphragm 12 is attached to the housing 6, so that the diaphragm 12 prevents viscous fluid from entering into the vacant chamber 33.

Between the bimetal 10 and the movable partition 30, is disposed an actuating pin 11 which extends through an aperture 15 located in the cover 4 so as to transmit a deformation of the bimetal 10 to the movable partition 30.

A cooling fan is attached to the housing 6 by a plurality of bolts inserted into threaded holes 40.

A rear side 2a of the rotor 2 provides a first shearing surface gap 16 between an interior wall 5a of the housing 6 and itself, and a front side 2b of the rotor 2 provides a second shearing surface gap 17 between a side 7a of the fixed partition 7 and itself.

Near the periphery of the movable partition 30, three cavities 39 are circumferentially disposed at an equal distance from each other for receiving coil springs 38 thereon. These coil springs 38 work for biasing the movable partition 30 away from the fixed partition 7, i.e. toward a left direction in FIG. 1.

Since the coupling is constructed as explained above, the bimetal 10 moves the movable partition 30 in axial directions depending upon a change of ambient temperature. This movement changes the axial distance between the movable partition 30 and the fixed partition 7. Thus, the fan revolution speed is controlled.

Under the condition of low ambient temperature, the bimetal 10 is curved as shown in FIG. 1. The movable partition 30 is pushed away from the fixed partition 7 by the coil springs 38, so that a large active chamber 32 is produced. Viscous fluid is pushed against the periphery of the torque transmitting chamber 9 due to a centrifugal force, and viscous fluid is raked out by the dam 44 from the chamber 9 into the active chamber 32 through the slot 42. The diaphragm 12 receives viscous fluid from the chamber 9. Then, an expanded segment 12c is produced in the diaphragm 12. Thus, there is little viscous fluid around the rotor 2. The transmitting torque is considerably reduced and the fan idling speed is lowered to minimum.

Figure 2:
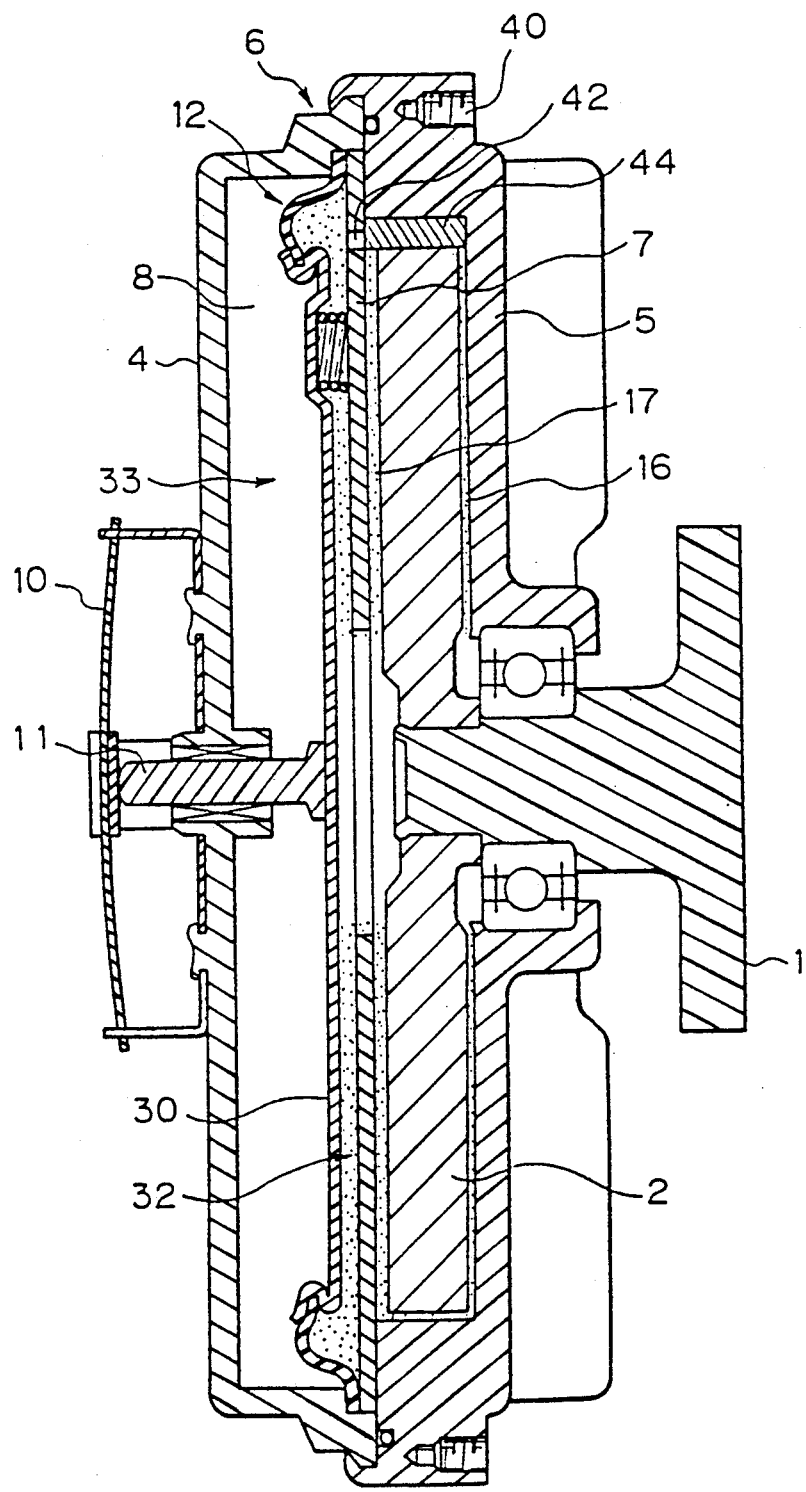
FIG. 2 is a vertical sectional view of the fluid friction coupling, showing ON condition of the coupling.

When the ambient temperature rises at a predetermined level, the bimetal 10 becomes flat as shown in FIG. 2. The movable partition 30 is moved toward the fixed partition 7 against the bias force of the coil springs 38, so that the active chamber 32 becomes smaller. Viscous fluid is pushed away from the expanded segment 12c, flowing into the shearing surface gaps 16 and 17 through the central opening 35. Thus, a transmitting torque is increased, whereby the fan revolution speed quickly goes up.

Although a bimetallic element is illustrated and described as the temperature sensitive element, it is also possible to use temperature sensitive materials such as thermowax.

I claim:

1. A temperature-controlled fluid friction coupling for intermittently driving a cooling fan of an internal combustion engine, and said coupling comprising:

a drive input shaft (1) having a rotor (2) thereon, a housing (6) defining an interior space provided so as to be rotatably supportable on the drive input shaft for supporting the cooling fan, said housing including a body (5) and a cover (4), a fixed partition (7) for dividing said interior space of said housing into a torque transmitting chamber (9) and a reservoir chamber (8), a movable partition (30) for dividing said reservoir chamber into an active chamber (32) and a vacant chamber (33), a flexible annular diaphragm (12), an interior edge of said diaphragm being attached to said movable partition, and a periphery of said diaphragm being attached to said housing, a temperature sensitive element (10) disposed outside of said housing, and an actuating pin (11) disposed between said temperature sensitive element and said movable partition, said fixed partition having a central opening (35) and a peripheral slot (42) for providing a fluid communication between said torque transmitting chamber and said active chamber, a rear side (2a) of said rotor providing a first shearing surface gap (16) between an interior wall (5a) of said housing and itself, a front side (2b) of said rotor providing a second shearing surface gap (17) between a side (7a) of said fixed partition and itself, said temperature sensitive element moving said movable partition in axial directions depending upon a change of ambient temperature thereby changing the axial distance between said movable partition and said fixed partition.

2. The temperature-controlled fluid friction coupling as set forth in claim 1, wherein a coil spring (38) is located on said movable partition for biasing said movable partition away from said fixed partition.

3. The temperature-controlled fluid friction coupling as set forth in claim 1, wherein a dam (44) is secured to a peripheral wall of said torque transmitting chamber such that its position corresponds to said peripheral slot in the fixed partition.

* * * * *